(12) United States Patent
Akin et al.

(10) Patent No.: US 6,182,245 B1
(45) Date of Patent: Jan. 30, 2001

(54) SOFTWARE TEST CASE CLIENT/SERVER SYSTEM AND METHOD

(75) Inventors: Benjamin P. Akin; Matthew G. Michels, both of Fort Collins, CO (US)

(73) Assignee: LSI Logic Corporation, Milpitas, CA (US)

( * ) Notice: Under 35 U.S.C. 154(b), the term of this patent shall be extended for 0 days.

(21) Appl. No.: 09/143,195

(22) Filed: Aug. 31, 1998

(51) Int. Cl.[7] .................................................. G06F 11/00
(52) U.S. Cl. ............................................. 714/38; 711/100
(58) Field of Search .................................. 714/38, 39, 46, 714/4, 20, 25, 26, 27; 711/100, 163, 147

(56) References Cited

U.S. PATENT DOCUMENTS

| | | | |
|---|---|---|---|
| 4,887,204 | 12/1989 | Johnson et al. | 364/200 |
| 5,295,222 | * 3/1994 | Wadhwa et al. | 395/1 |
| 5,371,883 | * 12/1994 | Gross et al. | 395/575 |
| 5,542,043 | 7/1996 | Cohen et al. | 395/183.08 |
| 5,619,710 | 4/1997 | Travis, Jr. et al. | 395/800 |
| 5,640,510 | * 6/1997 | Hanaoka et al. | 395/183.18 |
| 5,659,547 | * 8/1997 | Scarr et al. | 395/182.02 |
| 5,671,351 | 9/1997 | Wild et al. | 395/183.14 |
| 5,708,774 | 1/1998 | Boden et al. | 395/183.14 |
| 5,734,898 | 3/1998 | Qianshan He | 395/619 |
| 5,754,760 | * 5/1998 | Warfield | 395/183.14 |
| 5,761,665 | * 6/1998 | Gardner et al. | 707/100 |
| 5,896,494 | * 4/1999 | Perugini et al. | 395/183.03 |
| 5,991,897 | * 11/1999 | Perugini et al. | 714/27 |
| 6,002,868 | * 12/1999 | Jenkins et al. | 395/701 |

OTHER PUBLICATIONS

Gossain et al., Class state testing method in object oriented program, Derwent, Pub. No. US 5974255, 1–2, Oct. 1999.*
IBM Technical disclosure Bulletin, Testcase Automoation method, IBM Tech Bulletin, vol. 36, issue 8, 127–130, Aug. 1993.*

* cited by examiner

Primary Examiner—Nadeem Iqbal

(57) ABSTRACT

A software test case client/server system provides selective access to a central repository of test case data used in testing a software program. A test case server stores and manages test case data in a central repository. A test client communicates between a test program and the test server to identify tests case data, and versions of such data, with desired read/write status required in testing a software program. A test program automates selection of test case data, software program test execution, and verification of software program results. In an exemplary embodiment, symbolic links and copies of test case data are recorded in a destination directory structure accessible by a software program under test. In an alternate embodiment, a revision control system (RCS) is used to access the central repository and provide copies of selected test case data in a destination directory structure accessible by a software program under test. A method for communicating and implementing the desired test case access includes instructions initiated by a test client and received by a test server. A central repository administration application allows a user to organize, supplement and otherwise manage test case data and versions of such data. The client/server configuration further facilitates access by a plurality of users to a shared central repository of test case data without corrupting the test case data therein.

25 Claims, 6 Drawing Sheets

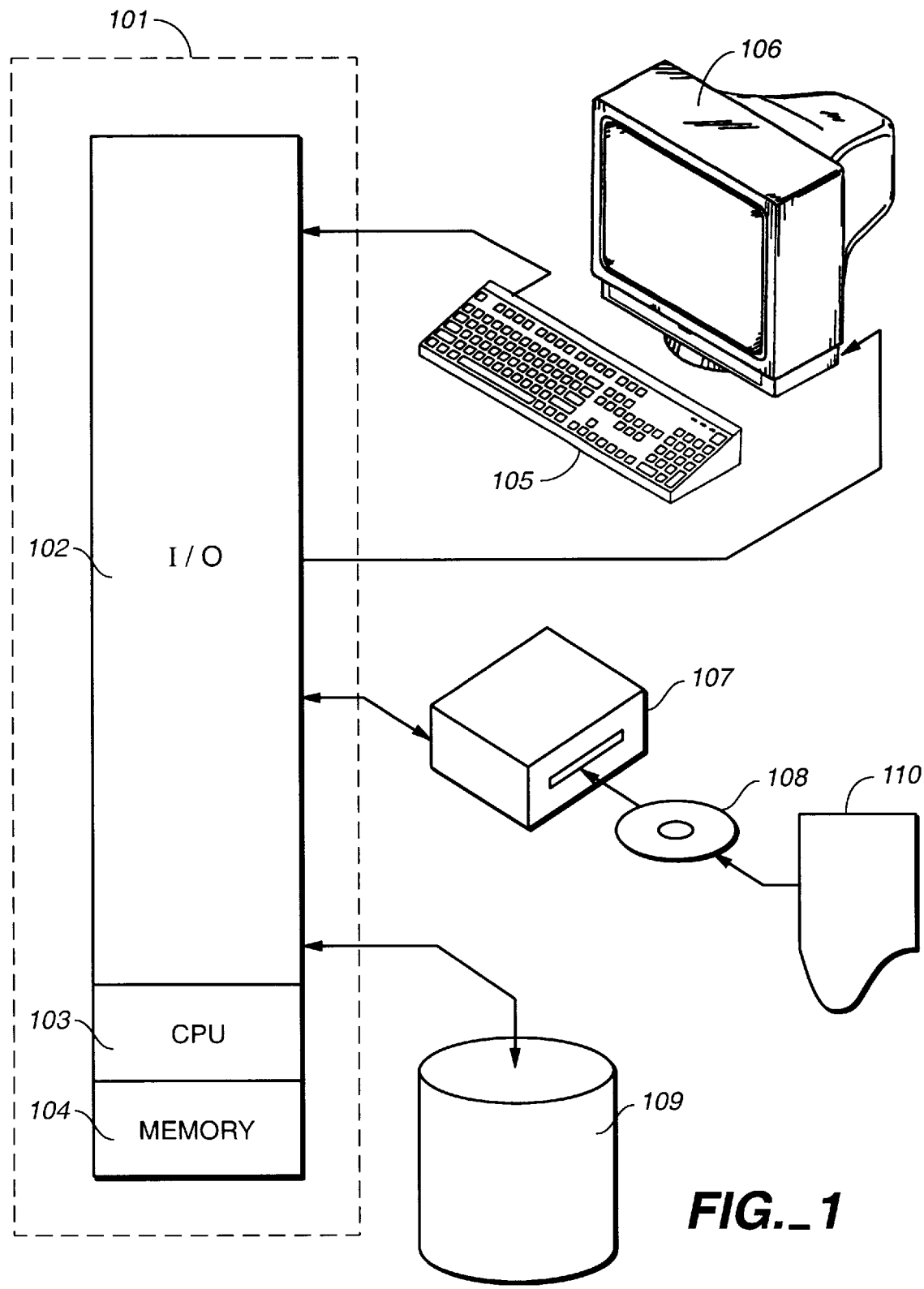
FIG._1

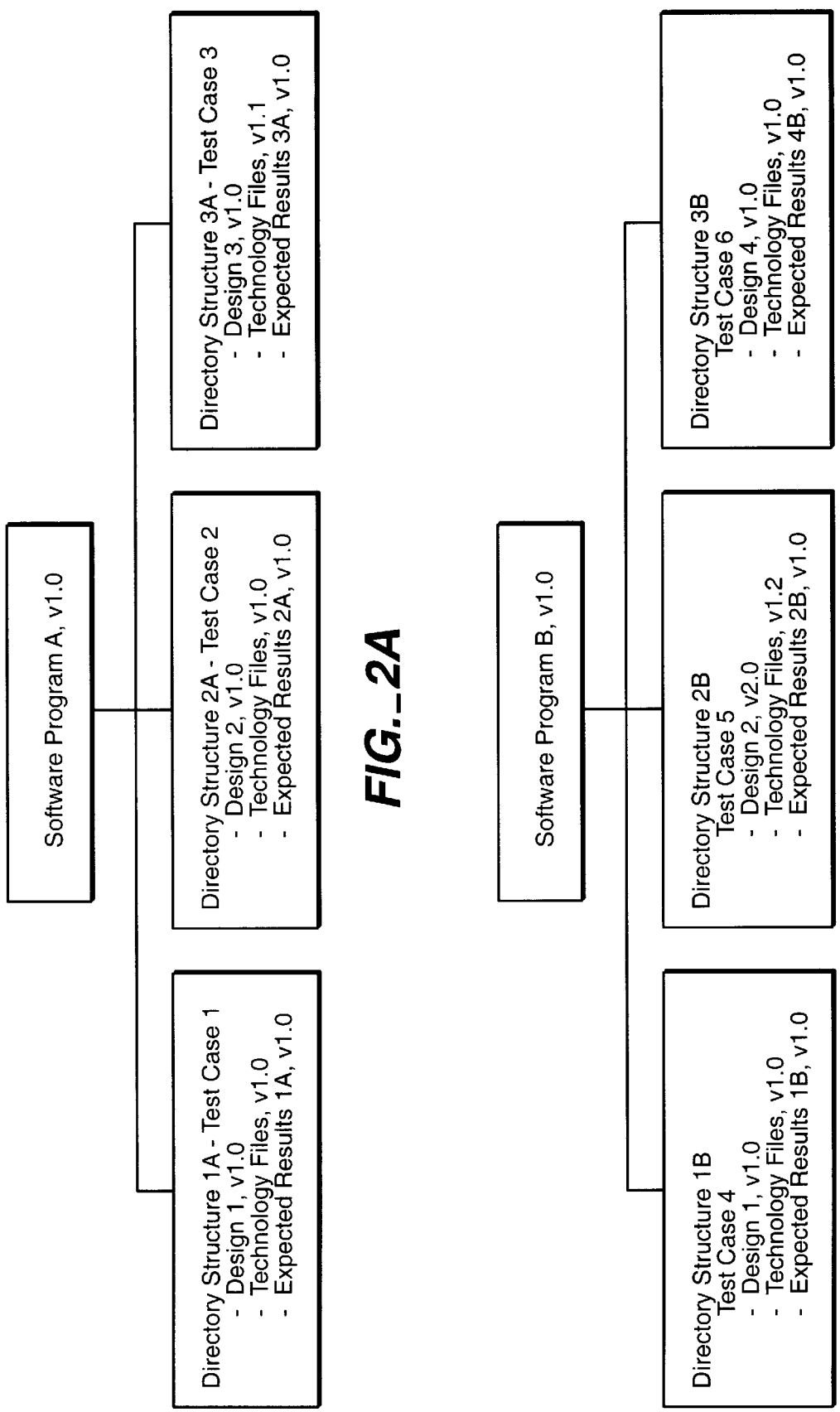

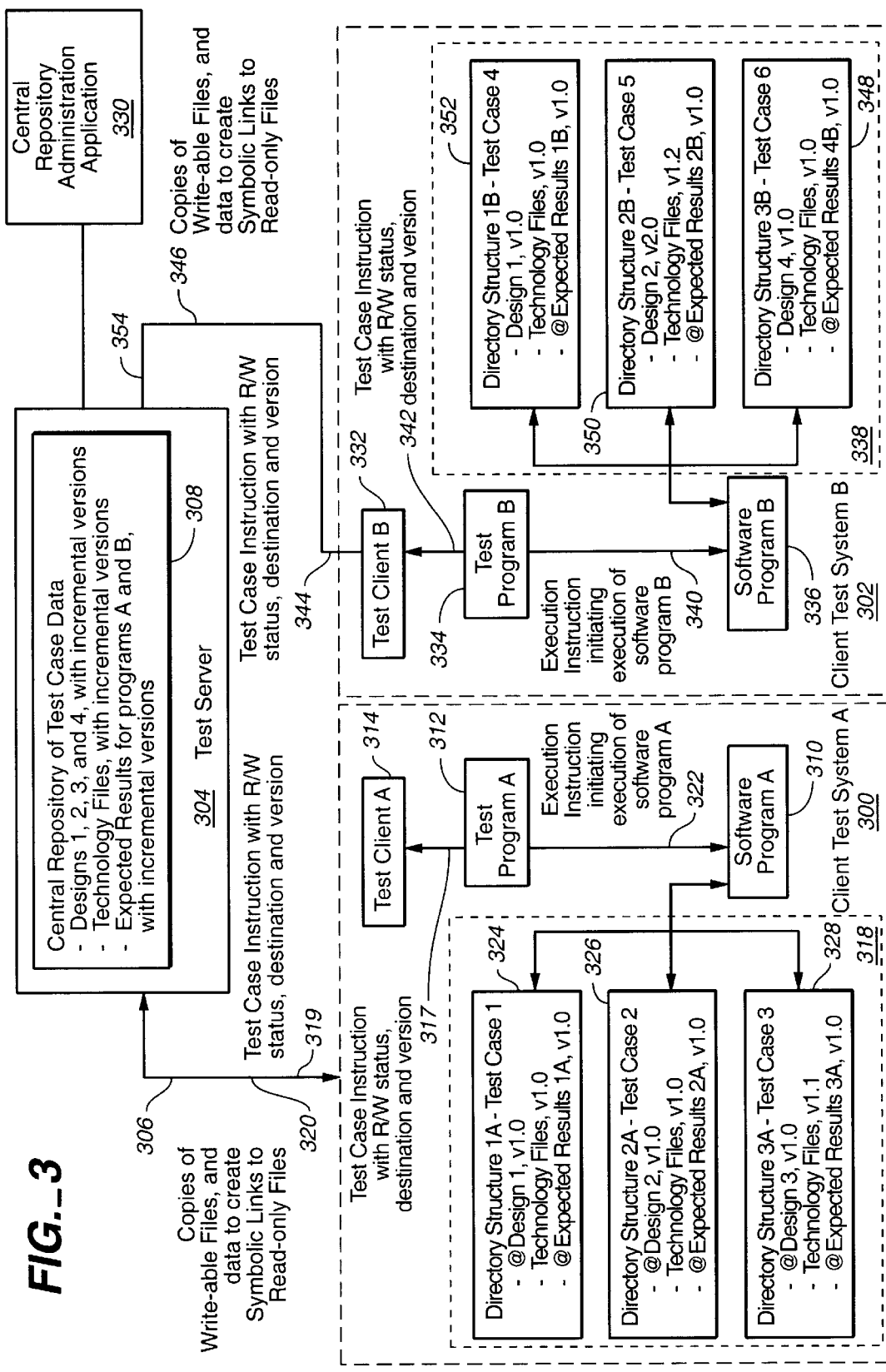
FIG._3

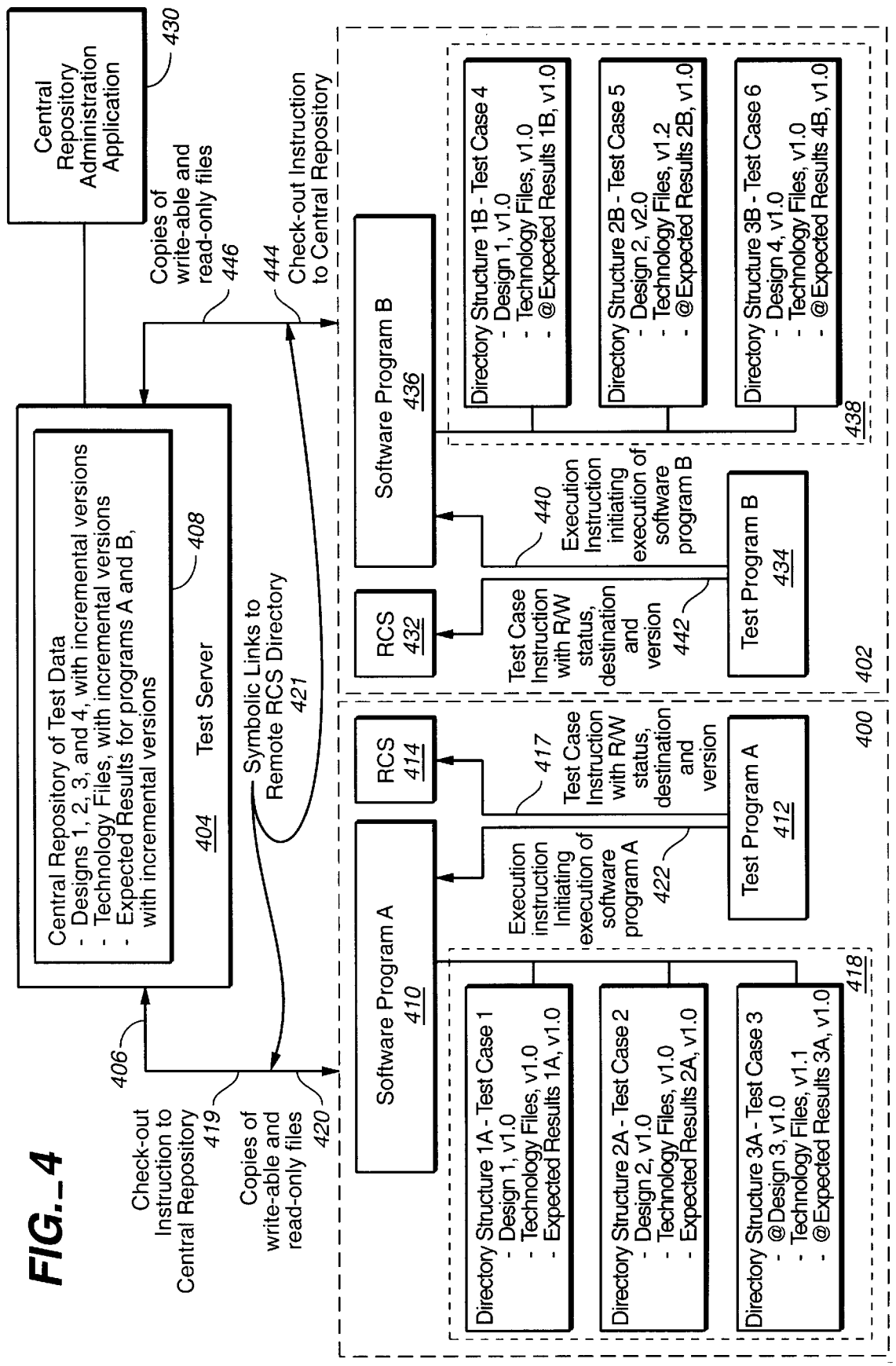
FIG._4

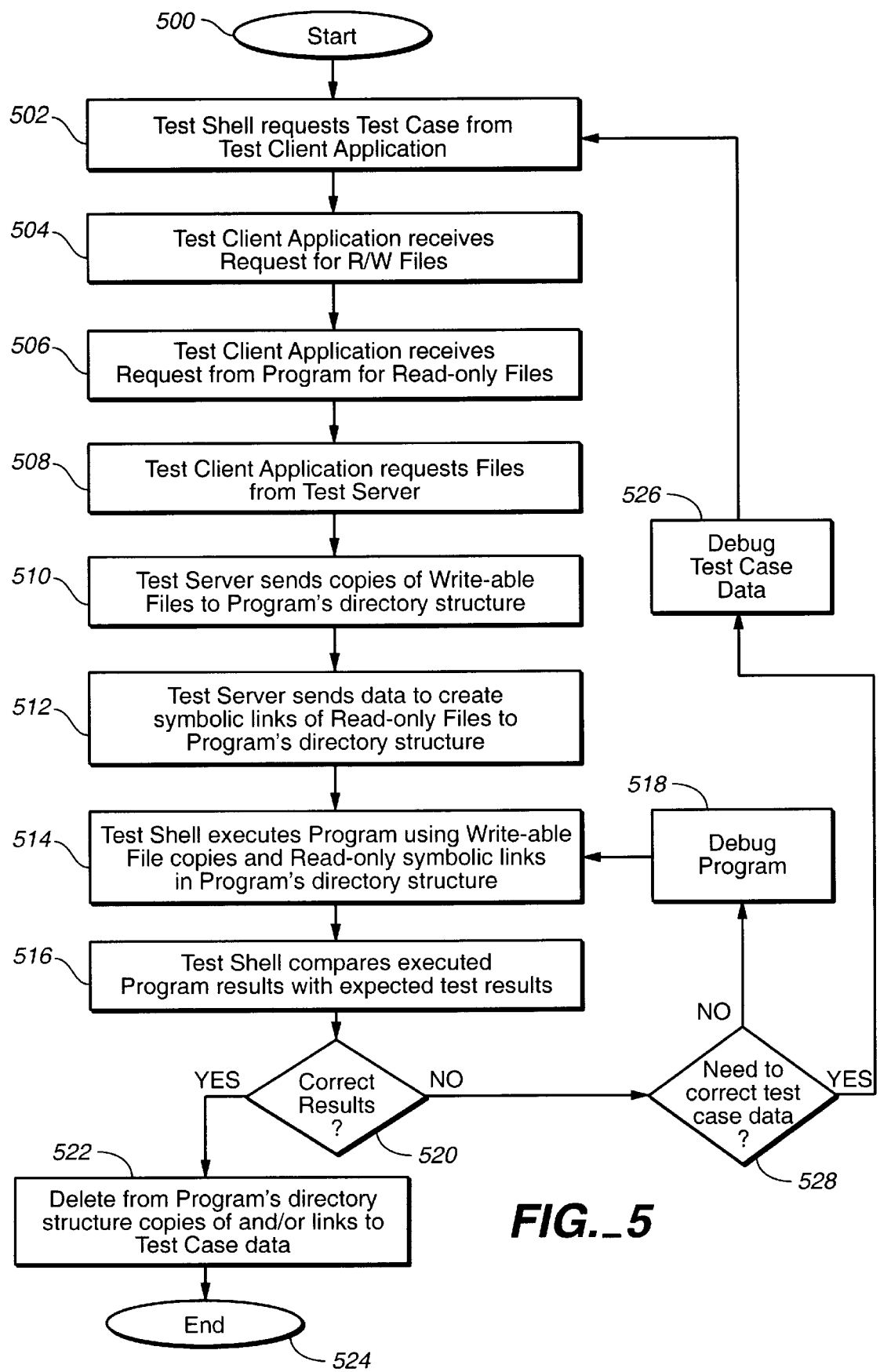
FIG._5

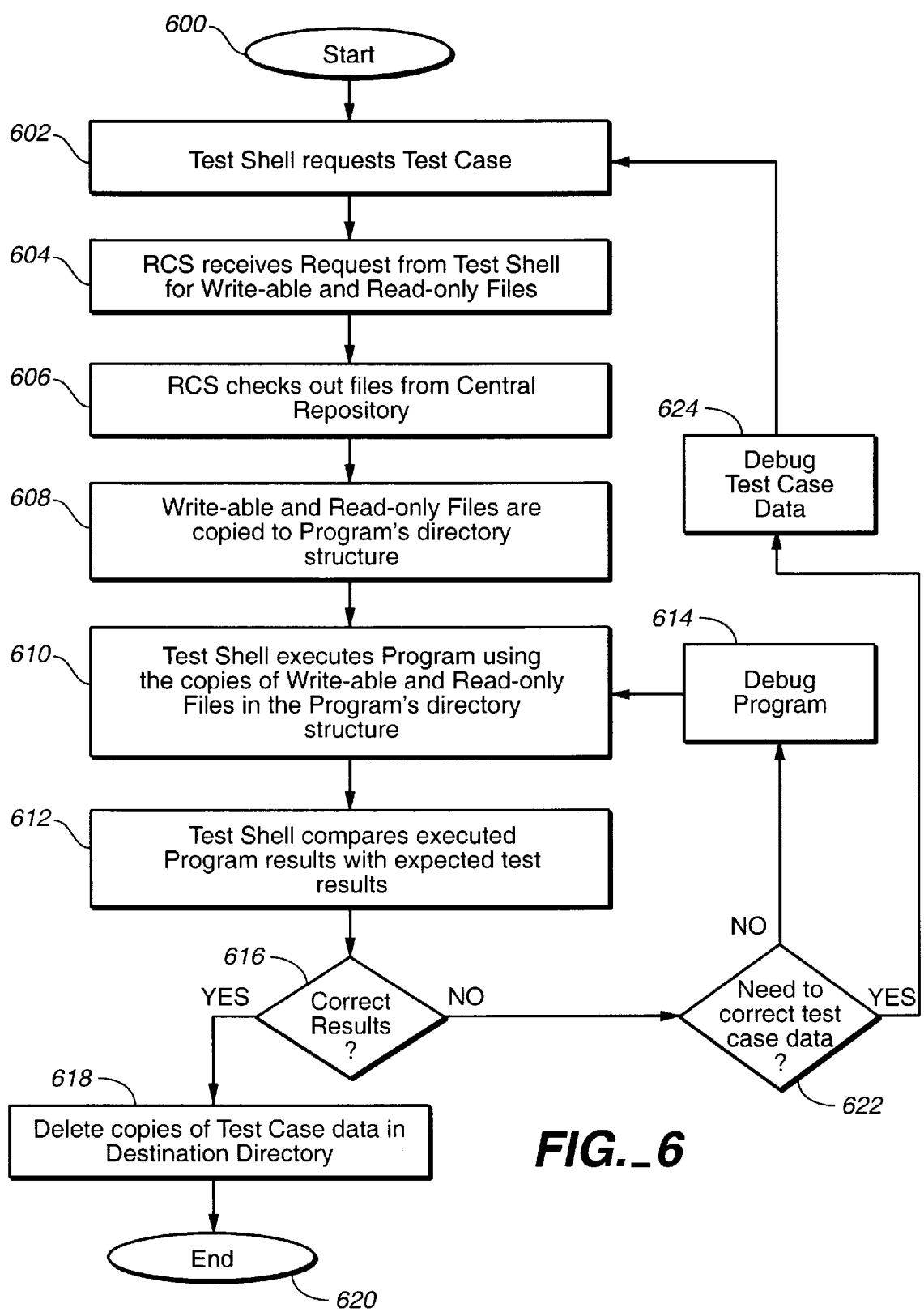
FIG._6

SOFTWARE TEST CASE CLIENT/SERVER SYSTEM AND METHOD

BACKGROUND OF THE INVENTION

1. Field of the Invention

The present invention pertains generally to electrical computers and more particularly to systems and methods for managing and distributing test data in a software development environment.

2. Description of Related Art

When a programmer, or a team of programmers, develops a software program or suite of programs, the software must be tested to verify its proper operation. One type of testing is called "regression testing", which is intended to exhaustively verify the proper operation of every portion of the software. Ideally, every line of software code and every possible execution path in the software is tested to achieve a regression test "coverage" of 100%. To achieve or approach such complete test coverage, regression testing generally requires input data representing one or more test case scenarios that are designed to exercise various aspects of the software. In combination, the test cases are generally intended to verify proper operation of all functional aspects of the software, with particular emphasis on crucial functionality, boundary conditions, exception handling, and specific real world conditions.

When an individual software component is being developed as part of a large software system, such as a Computer-Aided-Engineering (CAE) system or a telecommunications system, it is also advantageous to test each software component using the same or similar test cases so as to effect consistent testing throughout the software system. For example, in a CAE system for processing microelectronic circuit designs, a programmer may choose to test the software on a variety of designs. A typical combination of test cases might include an "exhaustive" design having a comprehensive selection of logic cells, interconnections, and operating conditions. Another test case might include an artificially large and complex design to test the functional capacity of the software. A third test case might include a design that includes a set of logic cells and combinational logic directed to specifically test particular functionality in the software. Test cases may also include non-design data, such as technology files, delay files, and parameter files, required by the particular software under test. Such designs and input files are typically used to test other programs in the CAE system as well.

A single test case may also comprise multiple designs. For example, a CAE program may consolidate multiple designs into a single design and, therefore, require multiple designs as inputs. Generally, test case designs are developed specifically for the purpose of testing the system's software, although real world designs are also frequently used to test such software. A final test case set is often determined at the discretion of the programmer or programming team based on software test requirements and specific target customers needs.

Furthermore, software testing typically involves verification of the software's proper operation against a set of expected results. Generally, each input test case is associated with a particular set of expected output data and, therefore, the input and expected output data are preferably managed together. As such, a programmer may wish to include both input test data and expected output data in a single test case.

In addition to multiple data sets, or test cases, a programmer may wish to organize test data in multiple versions. Whether the versions apply to individual test cases or to individual elements of test cases, the need to manage versions of test data further compounds the complexity of the testing process. Moreover, when test data is created, modified and used by multiple programmers testing individual software programs, the complexity of managing random access to a complex set of test data is amplified.

Another type of software testing is called "integration testing". In a CAE system, for example, where several software programs are used together to process circuit designs, each software component is required to function properly on the output of a previous software component in the engineering process and is required to generate proper output for a subsequent software component in the process. Accordingly, such interrelated software is typically tested sequentially, one software component receiving input from the previous software component to verify proper functionality and inter-compatibility at each stage in the process. Other types of testing, including user interface testing, endurance testing, and simulations, may also require management of input data and expected results.

SUMMARY OF THE INVENTION

It is an object of the present invention, to provide a software program with selective access to a plurality of test case data elements.

It is another object of the present invention to provide a system and method for distributing test case data elements to multiple test clients in accordance with read/write status and version parameters.

Additional objects, advantages and novel features of the invention are set forth in the description which follows and will become more apparent to those skilled in the art when taken in conjunction with the accompanying drawings. The objects and advantages of the invention may be realized and attained by the instrumentalities and accommodations particularly pointed out in the appended claims.

A system and a method in accordance with the present invention provide the advantages of maintaining test data in a central repository, allocating access to the test data using a test server, and initiating access to the test server using a test client that passes a test case instruction to the test server. The client-server relationship allows multiple users to access a shared central repository of test data without corrupting the test data therein. Furthermore, the functionality of selecting the proper test case data may be isolated from the software program under test by a test automation program and the client-server configuration.

To achieve the foregoing and other objects, in accordance with the purposes of the present invention, as embodied and broadly described herein, the system of this invention may comprise a central repository that stores a plurality of test case data elements in a storage medium, a test server coupled to the central repository; a test program that initiates a test case instruction identifying a data element of the plurality of test case data elements in the central repository; and a test client coupled the test server and the test program to receive the test case instruction from the test program and to request access to the identified data element from the test server, access to the identified data element being established in a destination directory structure that is remote from the central repository.

The present invention may also comprise, in accordance with its object and purposes, a method having the steps of providing a central repository that stores a plurality of test case data elements in a storage medium, access to the central repository being managed by a test server, sending a test case instruction that identifies a data element of a data element of the plurality of test case data elements in the central repository; receiving the test case instruction at a test server; locating the identified data element in the central repository; and establishing an access structure in the destination directory structure that provides access to identified data element, where the destination directory structure is remote from said central repository.

BRIEF DESCRIPTION OF THE DRAWINGS

FIG. 1 depicts a general purpose computer in accordance with the present invention.

FIGS. 2A and 2B depict an architecture for testing multiple programs using multiple test cases having a combination of shared data.

FIG. 3 depicts a block diagram of an exemplary embodiment of a client-server system in accordance with the present invention.

FIG. 4 depicts a block diagram of an alternate exemplary embodiment of a client-server system in accordance with the present invention.

FIG. 5 depicts a flow chart of an exemplary method for providing selective access to a central repository of test case data.

FIG. 6 depicts a flowchart of an alternate exemplary method of providing access to a central repository of test case data.

DETAILED DESCRIPTION

One operating environment in which the present invention is potentially useful encompasses the general purpose computer. In such a system, data and program files may be input to the computer, which reads the files and executes the programs therein. Some of the elements of a general purpose computer are shown in FIG. 1, wherein a processor 101 is shown having an input/output (I/O) section 102, a Central Processing Unit (CPU) 103, and a memory section 104. The present invention is optionally implemented in software devices loaded in memory 104 and/or stored on a configured CD-ROM 108 or storage unit 109 thereby transforming the computer system in FIG. 1 to a special purpose machine for implementing the present invention.

The I/O section 102 is connected to keyboard 105, display unit 106, disk storage unit 109, and disk drive unit 107. Generally, in contemporary systems, the disk drive unit 107 is a CD-ROM driver unit capable of reading a CD-ROM medium 108, which typically contains programs 110 and data. Computer program products or circuit models containing mechanisms to effectuate the apparatus and methods in accordance with the present invention may reside in the memory section 104, on a disk storage unit 109, or on the CD-ROM medium 108 of such a system. Alternatively, disk drive unit 107 may be replaced by a floppy drive unit, a tape drive unit, or other storage medium drive unit. Examples of such systems include SPARC systems offered by Sun Microsystems, Inc., personal computers offered by IBM Corporation and by other manufacturers of IBM-compatible personal computers, and other systems running a UNIX-based or other operating system. In accordance with the present invention, software program modules, such as programs under test, a test shell, and a test client, may be executed by CPU 103, and test case data elements and other data may be stored on disk storage unit 109, disk drive unit 107 or other storage medium drive units coupled to the system.

FIGS. 2A and 2B illustrate architectures for testing multiple software components (software program A 200 and software program B 202) on multiple test cases (test case 1A 204, test case 2A 206, test case 3A 208, test case 1B 210, test case 2B 212, and tests case 3B 214). Collectively, the test cases include multiple designs, represented by a design representation, delay files, technology files, and layout files. A circuit design representation, such as a circuit netlist or a Register Transfer Level (RTL) description, represents the logical or functional composition of a circuit design. A netlist is typically a list of electronic logic cells with a description of the interconnections between the inputs and the outputs of the various logic cells. An RTL description is a description of the functionality of the circuit, much like programming source code is a description of the functionality of a software program. Delay files, such as Standard Delay Format (SDF) file, may also be required inputs to the software programs. In addition, expected results file may be used in verification of the results of the software test. Each test case is recorded and maintained in a subdirectory coupled to the corresponding software program under test. Generally, these subdirectories reside in a test system executing the software program, but they may also be coupled thereto by a communications network (as shown by 220 and 222).

FIG. 3 depicts a block diagram of an exemplary embodiment of the present invention. Client test system A 300 is a computer system remotely coupled to test server 304 by communications network 306. Communications network 306 may comprise a LAN, a WAN, a telecommunications network, a serial connection, a parallel connection, or other communications network for transmitting digital data. Test server 304 includes a central repository 308 that stores test case data elements. In an exemplary embodiment, central repository 308 is a directory structure containing input test data, such as circuit design databases and associated technology files, and output test data, such as expected results of a software/program's execution. Central repository 308 may alternatively be embodied in a database that includes test case data. In general, the central repository may include data or code files, pointers or links to data or code files, entries in one or more data/code tables, or other test case data or code representations, all referred to herein as "data elements".

Client test system A 300 includes software program A 310, test program A 312, test client A 314 and destination directory structure A 318. Test program A 312 is a test shell that automates the testing sequence. In an exemplary embodiment, test program A 312 is a batch file or a shell script that inputs a description of the desired test case data elements (shown as test case instruction 317), with desired read-write (R/W) status, destination, and version of each test case data element, to test client A 314. Test client A 314 issues test case instruction 319 to test server 304. Test case instruction 317 may comprise the same information as that received from test program A 312, or it may contain more or less information within the scope of the present invention. Test server 304 locates the requested test case data element, such as design 1, and provides software program A 310 access to the located data element via destination directory structure A 318.

In an exemplary embodiment, after access to the desired test case data is established, test program A 312 issues execution instruction 322 to execute software program A 310. Likewise, test program A 312 may also compare the actual results produced from the execution of software program A 310 with a set of expected results from the central repository. Test program A 312 may also perform other test automation tasks, including production and analysis of test statistics, management of predetermined test flows, and data management. For example, if the actual results of software program A 310's execution match the expected results, test program A 312 may delete the local copies of and links to test case data (see FIGS. 5 and 6). Test program A 312 may also create reports relating to the test, including test coverage statistics or error summaries.

In the embodiment illustrated in FIG. 3, software program A 310's access to requested test case data elements may be provided in a manner shown at 320. First, if test program A 312 requests a test case data element with a read-only status, a symbolic link to the data element stored in central repository 308 is recorded in destination directory structure A 318. A symbolic link is represented in FIG. 3 (and FIG. 4) using an "@" symbol, in accordance with UNIX convention. Other link-like structures may be used as well, including "shortcuts" supported in Microsoft Windows 95, Windows 98, and Windows NT. If, however, test program A 312 requests a test case data element with a write-able status, a copy of the write-able test case data element from central repository 208 is stored in destination directory structure A 318. In this manner, software program A 310 can modify the write-able test case data element without corrupting the test case data in the central repository. Both links to and copies of data elements comprise access structures for providing a software program with access to test data stored in a central repository.

For example, in the illustrated embodiment of FIG. 3, central repository 308 includes circuit designs 1, 2, 3 and 4. In addition, central repository 308 also includes incremental versions of these designs. That is, after a test case design is modified, both the previous version and the newly modified version of the design are stored in the central repository. Each version of a design may be differentiated from another using a naming convention, a directory hierarchy, tags within the design itself, a revision control system, or other known methods. Likewise, other required files are also stored in the central repository, and such files may also stored with incremental versions. In addition, expected results for programs to be tested may also be stored in the central repository, along with incremental versions of such files.

In an exemplary embodiment of the present invention, incremental versions of test case data elements are stored as differences from version to version. That is, a previous version is not stored as a complete copy of the previous version. Instead, the differences between the previous version and the current version are stored. To obtain a complete copy of the previous version, the revision control system (RCS) reconstructs the previous version by applying the recorded differences to the copy of the current version, resulting in a complete copy of the previous versions. This technique may be sequentially applied to incrementally older versions to obtain a complete copy of any previous version. An example of a revision control system is the UNIX application, RCS, described in detail in the UNIX online man pages for RCS (type "man rcs", "man ci", "man co", "man rcsfreeze", etc. for each supported RCS component), specifically incorporated herein by reference for all that they disclose and teach.

Generally, any data element required to properly test a software program may be stored and organized within the central repository. The central repository may comprise a directory structure on a single storage medium, a combination of directory structures on multiple storage mediums, or other database formats that support locating data elements using static identifiers or other dynamic criteria.

In FIG. 3, the illustrated destination directory structure A 318 depicts an example of three test cases requested by test program A 312 for use in testing software program A 310. Subdirectory structure 1A 324, includes test case 1, which comprises a symbolic link to version 1.0 of read-only design 1.0, a copy of version 1.0 of technology files, and a symbolic link to version 1.0 of read-only file, expected results 1A. As illustrated in subdirectory structures 2A 326 and 3A 328, various combinations of test case data elements may be combined to constitute a particular test case. There are no limits to the compositions of test cases, which may include data elements that are mutually exclusive with or shared by other test cases. Furthermore, a single test case may comprise multiple designs, multiple expected results or other data files, and program code. Generally, the composition of a test case is dictated by the requirements of the software program tests.

Central repository administration application 330 allows a user to create, organize, and manage the central repository. Central repository administration application 330 is generally an application, such as a revision control system, that executes on a general purpose computer coupled to the central repository. An exemplary central repository administration application 330 allows test case data elements to be grouped under a specified label or "unique symbolic revision number" ("C_number") to ease identification of a group of elements. For example, the rcsfreeze command in UNIX assigns a symbolic revision number to a set of RCS files, which form a valid configuration. It is recommended in the rcsfreeze man page, specifically incorporated herein by reference for all that it discloses and teaches, to run rcsfreeze each time a new version is checked in. A unique symbolic revision number is then assigned to the most recent revision of each RCS file of the main revision tree trunk. This command allows a user to define versions of an entire test case or of some subset of the test case (e.g., a design and associated support files).

In an alternate exemplary embodiment, a custom application performs administration of the central repository. The application understands and establishes the interdependencies between the various data elements in the central repository. The application checks the data elements into the central repository according to rules input by a user. For example, a design file and associated support files may be checked into the central repository as a bound set, such that subsequent check-outs by a test client cannot merely check out individual files from the bound set. In addition, a user may assign a rule preventing write-able access by a test client. Rules may also establish relationship between data elements, such that a test client receives a message or warning if it attempts to check out a first data element without also checking out a related second data element. Other rules may be also implemented by a customized central repository administration application within the scope of the present invention.

FIG. 3 also illustrates client test system B, comprising test client B 332, test program B 334, software program B 336, and destination directory structure B 338. The structure and functionality of client test system B 302 is similar to that of client test system A 300. Furthermore, in an alternate embodiment, test client A 314 and test client B 332) may be combined into the same client application for servicing both client test systems. As with software program A 310, software program B 336 has access to a destination directory structure that provides access to selected test case data elements. For example, in the exemplary embodiment in FIG. 3, three subdirectories of destination directory structure B 338 include individual test cases: access to test case 4 is stored in subdirectory structure 1B 352, access to test case 5 is stored in subdirectory structure 2B 350; and access to test case 6 is stored in subdirectory structure 3B 348.

A comparison of the test cases in FIG. 3 shows that each destination directory structure provides independent access to test case data elements. For example, Design 1, v1.0, of Test Case 1 in subdirectory structure 1A 324 is represented as a symbolic link to the corresponding file in central repository 308 because test program A 312 requested read-only access to the design for testing software program A 310. In this exemplary configuration, software program A 310 has exclusive access to the test case data via destination directory structure A 318 to avoid corruption of test case data by other programs. In contrast, Design 1, v1.0, of Test Case 4 is represented as a copy of the corresponding file in central repository 304 because test program B 334 requested writeable access to the design for testing software program B 336.

As with test program A 312, test program B 334 initiates access for software program B 336 to requested test data elements by sending a test case instruction 342 to test client B 332. In an exemplary embodiment, test program B 334 is batch file or a shell script that inputs a description of the desired test case data elements (shown as test case instruction 342), with desired read-write status, destination, and version of each test case data element, to test client B. Test client B 332 issues test case instruction 344 to test server 304. Test server 304 locates the requested test case data element, such as Design 2, v2.0, and provides software program B 336 access to the located data element via destination directory structure B 338. Test program B 334 may perform tasks associated with test program A 312, or it may be independent of test program A 312. Likewise, software programs A 310 and B 336 may be part of an interrelated software system, or they may be independent programs related only by the data stored in central repository 308.

FIG. 4 depicts a block diagram of an alternate exemplary embodiment of the present invention. Client test system A 400 is a computer system coupled to test server 404 by communications network 406. Communications network 406 may comprise a LAN, a WAN, a telecommunications network, a serial connection, a parallel connection, or other communications network for transmitting digital data. Test server 404 includes a central repository 408 that stores test case data elements. In an exemplary embodiment, central repository 408 is similar to central repository 308 of FIG. 3 and may comprise a directory structure containing input test data, such as circuit design databases and associated technology files, and output test data, such as expected results of a software program's execution.

Client test system A 400 includes software program A 410, test program A 412, test client A 414 and destination directory structure A 418. Test program A 412 is a test shell that automates the testing sequence. In an exemplary embodiment, test program A 412 is a batch file or a shell script that inputs a description of the desired test case data elements (shown as test case instruction 417), with desired read-write status, destination, and version of each test case data element, to RCS application 414. RCS Application 414 issues test case instruction 419 to test server 404. Central repository 408 is represented in client test system A 400 as a symbolic link 421 to a remote RCS directory that embodies the central repository 408 in test server 404. Responsive to test case instruction 417, RCS application 414 "checks out" copies of requested test case data (at 417) elements from central repository 408 and records copies 420 of the data elements in a destination directory location identified in the test case instruction 417.

In an exemplary embodiment, after copies of the desired test case data are established in the destination directory structure 418, test program A 412 issues execution instruction 422 to execute software program A 410. Likewise, test program A 412 may also compare the actual results produced from the execution of software program A 410 with a set of expected results from the central repository. Test program A 412 may also perform other test automation tasks, including production and analysis of test statistics, management of predetermined test flows, and data management. For example, if the actual results of software program A 410's execution match the expected results, test program A 412 may delete the local copies of and links to test case data (see FIGS. 5 and 6). Test program A 412 may also create reports relating to the test, including test coverage statistics or error summaries.

In FIG. 4, the illustrated destination directory structure A 418 depicts an example of three test cases requested by test program A 412 for use in testing software program A 410. Directory structure 1A 424, includes test case 1. Test case 1 comprising a copy of version 1.0 of read-only design 1, a copy of version 1.0 of technology files, and a copy of version 1.0 of read-only file expected results 1A. As illustrated in directory structures 2A 426 and 4A 428, various combinations of test case data elements may be combined to constitute a particular test case. There are no limits to the compositions of test cases, which may include data elements that are mutually exclusive with or shared by other test cases. Furthermore, a single test case may comprise multiple designs, multiple expected results or other files, and program code. Generally, the composition of a test case is dictated by the requirements of the software program tests.

Central repository administration application 430 allows a user to create, organize, and manage the central repository. Central repository administration application 430 is generally an application, such as a revision control system, that executes on a general purpose computer coupled to the central repository. An exemplary central repository administration application 430 allows test case data elements to be grouped under a specified label to east identification of a group of elements.

FIG. 4 also illustrates client test system B, comprising test client B 432, test program B 434, software program B 436, and destination directory structure B 438. The structure and functionality of client test system B 402 is similar to that of client test system A 400. Furthermore, in an alternate embodiment, RCS Application A 414 and RCS Application 432) may be combined into the same client application for servicing both client test systems. As with software program A 410, software program B 436 has access to a destination directory structure that provides access to selected test case data elements. For example, in the exemplary embodiment in FIG. 4, three subdirectories of destination directory structure B 438 include individual test cases: access to test case 4 is stored in subdirectory structure 1B 452, access to test case 5 is stored in subdirectory structure 2B 450; and access to test case 6 is stored in subdirectory structure 3B 448.

A comparison of the test cases in FIG. 4 shows that each destination directory structure provides independent access to test case data elements. For example, Design 1, v1.0, of Test Case 1 in subdirectory structure 1A 424 is represented as a copy of the corresponding file in central repository 408. In this exemplary configuration, software program A 410 has exclusive access to the test case data in destination directory structure A 418 to avoid corruption of test case data by other programs. In contrast, Design 1, v1.0, of Test Case 4 is represented as a copy of the corresponding file in central repository 404 because test program B 434 requested write-able access to the design for testing software program B 436.

As with test program A 412, test program B 434 initiates access for software program B 436 to requested test data elements by sending a test case instruction 442 to test client B 432. In an exemplary embodiment, test program B 434 is batch file or a shell script that inputs a description of the desired test case data elements (shown as test case instruction 442), with desired read-write status, destination, and version of each test case data element, to test client B. Test client B 432 issues test case instruction 444 to test server 404. Test server 404 locates the requested test case data element, such as Design 2, v2.0, and provides software program B 436 access to the located data element by copying the requested data elements into destination directory structure B 438. Test program B 434 may perform tasks associated with test program A 412 or may be independent of test program A 412. Likewise, software programs A 410 and B 436 may be part of an interrelated software system, or they may be independent programs related only by the data stored in central repository 408.

FIG. 5 depicts a flowchart of an exemplary method for providing selective access to test case data elements. The process commences at start 500, and proceeds to block 502, where a test shell requests a test case from a test client. In block 504, the test client receives a request for write-able files from the test shell. Write-able files are those files that may be modified by the software program that is being tested. In some software testing scenarios, block 504 may be skipped if no write-able files are required. In block 506 the test client receives a request for read-only files, which are files that are not to be modified by the software program during testing. Block 506 may be skipped if no read-only files are required.

In block 508, the test client requests from the test server the files identified by the test shell. This request is accompanied by required parameters, such as a destination directory location, read-write status, and a version identifier, for each requested data element. In block 510, the test server sends copies of the files requested as "write-able" to the specified destination directory structure. Block 510 may be skipped if no write-able files are required. In block 512, the test server sends data to create symbolic links in the specified directory structure for linking to read-only files in the central repository. Alternately, the test client can establish the symbolic links for linking to read-only files in the central repository. Block 512 may be skipped if no read-only files are required.

In block 514, the test shell executes the software program using write-able file copies and/or read-only symbolic links (recorded in the destination directory structure) as inputs to the software program. In block 516, the test shell compares the results of the executed software program with a set of expected results, preferably accessed from the central repository. Typically, the expected results are included in the central repository, and are accessed by the test shell using the test case client-server system. In decision block 520, processing branches to block 528 if an error is detected in the actual results. Block 528 determines whether changes are required to the test case data. If the test case data must change, processing proceeds to block 526 where the user modifies the test case data, preferably through a central repository administration application. Any necessary modification to the program can also be made in block 526. Thereafter, processing proceeds to block 502 to provide access to the newly amended or added test case data. If no changes to the test case data are required, then processing proceeds to block 518, where a user debugs the software program, and loops back to block 510 to repeat the testing process. If, in block 520, the actual results satisfy the expected results, processing proceeds to block 522. In block 522, the test shell deletes local copies of and/or links to test case data. Test shell may also generate test reports or analyze statistical data, such as test coverage. Alternately, block 522 may be skipped if post processing of the test case data or results is not required. Processing terminates in block 524.

FIG. 6 depicts a flowchart of an alternate exemplary embodiment of the present invention. Processing commences at start 600. A test shell requests a test case in block 602. An RCS application (acting as a test client) receives the request from the test shell for write-able and/or read-only files in block 604. In block 606, RCS "checks out" the requested files from the central repository coupled to a test server. In block 608 copies of write-able and/or read-only files are copied into the destination structure. In block 610, the test shell executes the software program to be tested using the copies of write-able and read-only files in the destination directory structure as input. In block 612, the test shell compares the actual results of the software program with expected results. The expected test results may also be "checked out" of the central repository. If, in block 616, the actual results are incorrect as compared to the expected test results, processing proceeds to block 622, which determines whether changes are required to the test case data. If the test case data must change, processing proceeds to block 624 where the user modifies the test case data, preferably through a central repository administration application. Any necessary modification to the program can also be made in block 624. Thereafter, processing proceeds to block 602 to provide access to the newly amended or added test case data. If no changes to the test case data are required, a user can debug the program in block 614 and reroute the processing to block 610 to retest the software. If the program results are determined to be correct in block 616, processing proceeds to block 618 where a test shell deletes local copies of the test case data in the destination directory. Other post-processing tasks can also be executed in block 618, such as statistics analysis and report generation. Processing terminates at block 620.

While the method disclosed herein has been described and shown with reference to particular steps performed in a particular order, it will be understood that these steps may be combined, sub-divided, or re-ordered to form an equivalent method without departing from the teachings of the present invention. Accordingly, unless specifically indicated herein, the order and grouping of the steps is not a limitation of the present invention.

Moreover, while there have been described herein the principles of the present invention in conjunction with specific system and method implementations, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein.

Although claims have been formulated in this application to particular combinations of features, it should be understood that the scope of the disclosure herein also includes any novel feature or any novel combination of features disclosed either explicitly or implicitly for any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived thereof.

What is claimed is:

1. A system for providing a software program with selective access to a plurality of test case data elements, said system comprising:
   a destination directory structure coupled to said software program;
   a central repository that stores said plurality of test case data elements in a storage medium, said central repository being remote from said destination directory structure;
   a test server coupled to said central repository;
   a test program that initiates a test case instruction identifying a data element of said plurality of test case data elements in said central repository; and
   a test client coupled said test server and said test program to receive said test case instruction from said test program and to request an access structure to said identified data element from said test server, said access structure to said identified data element being established in said destination directory structure.

2. The system of claim 1 further comprising a execution instruction generated by said test program that initiates an execution of said software program based on said identified data element.

3. The system of claim 1 wherein said identified data element contains expected results of an execution of said software program, the system further comprising a verification module that compares actual results of said execution of said software program with said expected results of said execution accessible in said destination directory structure.

4. The system of claim 1 wherein said test case instruction comprises a data structure that includes a test case data element identifier, an associated read/write status, an associated location parameter defining a location in said destination directory structure, and an associated version parameter identifying a version of said identified data element.

5. The system of claim 4 wherein said identified data element is located in said central repository and said access to said identified data element comprises a symbolic link to said identified data element, if said associated read/write status equals read-only, said symbolic link being located in said destination directory structure.

6. The system of claim 4 wherein said identified data element is located in said central repository and said access to said identified data element comprises a copy of said identified data element, if said associated read/write status equals write-able, said copy being located in said destination directory structure.

7. The system of claim 1 wherein said access to said identified data element comprises a copy of said identified test case data element provided from a revision control system directory located in said central repository.

8. The system of claim 1 wherein said test case instruction comprises a test case identifier defining a specified subset of said plurality of test case data elements to said software program requires access via said destination directory structure.

9. The system of claim 1 wherein said central repository is located in said test server, and said software program and said destination directory structure are located at a client test system.

10. The system of claim 1 wherein said central repository stores a plurality of versions of at least one of said plurality of test case data elements, and said identified data element is a past version of one of said plurality of test case data elements.

11. The system of claim 1 further comprising a central repository administration application for managing data and labels associated with said test case data elements stored in said central repository.

12. A method for providing a software program with selective access to a plurality of test case data elements, said software program being coupled to a destination directory structure, said method comprising the steps of:
   providing a central repository that stores said plurality of test case data elements in a storage medium, said central repository being remote from said destination directory structure;
   providing a test server coupled to said central repository;
   managing access to said central repository;
   sending a test case instruction that identifies a data element of a data element of said plurality of test case data elements in said central repository;
   receiving said test case instruction at a test server;
   locating said identified data element in said central repository; and
   establishing an access structure in said destination directory structure that provides access to said identified data element.

13. The method of claim 12 wherein the step of establishing an access structure comprises the step of copying said identified data element to said destination directory structure, if said identified data element was requested with a write-able status.

14. The method of claim 12 wherein the step of establishing an access structure comprises the step of creating in said destination directory structure a symbolic link to said identified data element in said central repository, if said identified data element was requested with a read-only status.

15. The method of claim 12 wherein the step receiving said test case instruction at a test server comprises the step of receiving a test case data element identifier, an associated read/write status, an associated location parameter defining a location in said destination directory structure, and an associated version parameter identifying a version of said identified data element.

16. The method of claim 12 further comprising the step of initiating execution of said software program such that said software program operates on said access structure in said destination directory structure.

17. The method of claim 12 wherein said identified data element represents an expected result of an execution of said software program, and further comprising the step of verifying an actual result of an execution of said software program with said expected result.

18. The method of claim 17 further comprising the step of deleting said access structure if, responsive to said verifying step, said actual results match said expected result.

19. The method of claim 17 further comprising the step of executing a modified version of said software program if, responsive to said verifying step, said actual results do not match said expected result.

20. A system for providing a software program with selective access to a plurality of test case data elements, said system comprising:
- a destination directory structure coupled to said software program;
- a central repository that stores said plurality of test case data elements in a storage medium, said central repository being remote from said destination directory structure;
- a test server coupled to said central repository;
- means for sending a test case instruction that identifies a data element of a data element of said plurality of test case data elements in said central repository;
- means for receiving said test case instruction at said test server;
- means for locating said identified data element in said central repository; and
- means for establishing an access structure in said destination directory structure that provides access to said identified data element.

21. The system of claim 20 wherein said identified data element resides in said central repository and said access structure is a link to said identified data element.

22. The system of claim 20 wherein said identified data element resides in said central repository and said access structure is a copy of said identified data element.

23. A program storage medium, readable by a computer, tangibly embodying a test program of instructions executable by said computer for providing a software program with selective access to a plurality of test case data elements, said software program being coupled to a destination directory structure, the test program comprising instructions for:
- providing a central repository that stores said plurality of test case data elements in a storage medium, access to said central repository being managed by a test server, said destination directory structure being remote from said central repository;
- sending a test case instruction that identifies a data element of a data element of said plurality of test case data elements in said central repository;
- receiving said test case instruction at a test server;
- locating said identified data element in said central repository; and
- establishing an access structure in said destination directory structure that provides access to said identified data element.

24. The program storage medium of claim 23 wherein said identified data element resides in said central repository and said access structure is a link to said identified data element.

25. The program storage medium of claim 23 wherein said identified data element resides in said central repository and said access structure is a copy of said identified data element.

* * * * *